(12) United States Patent
Rodgers et al.

(10) Patent No.: US 7,478,158 B1
(45) Date of Patent: Jan. 13, 2009

(54) BANDWIDTH MANAGEMENT SYSTEM

(75) Inventors: Dwight O. Rodgers, San Francisco, CA (US); Brian P. Connolly, San Francisco, CA (US); James T. Morris, San Francisco, CA (US); Laurent E. Sellier, San Francisco, CA (US); Basil C. Hosmer, Winchester, MA (US)

(73) Assignee: Adobe Systems Incorporated, San Jose, CA (US)

( * ) Notice: Subject to any disclaimer, the term of this patent is extended or adjusted under 35 U.S.C. 154(b) by 831 days.

(21) Appl. No.: 10/791,311

(22) Filed: Mar. 1, 2004

(51) Int. Cl.
*G06F 15/16* (2006.01)
*G06F 15/173* (2006.01)
*H04L 12/28* (2006.01)
*H04L 12/56* (2006.01)
*H04K 1/00* (2006.01)
*H04L 9/00* (2006.01)
*H04B 7/00* (2006.01)

(52) U.S. Cl. .................. 709/226; 709/219; 709/229; 705/52; 370/310; 370/395.21; 370/395.42

(58) Field of Classification Search ............... 709/203, 709/217–219, 226, 229, 231, 234, 249; 370/310, 370/395.21, 395.41, 395.42, 395.43; 705/52
See application file for complete search history.

(56) References Cited

U.S. PATENT DOCUMENTS

| 5,727,171 | A | * | 3/1998 | Iachetta, Jr. .................. 710/107 |
| 6,002,675 | A | * | 12/1999 | Ben-Michael et al. ....... 370/315 |
| 6,578,068 | B1 | * | 6/2003 | Bowman-Amuah ......... 709/203 |
| 6,640,248 | B1 | * | 10/2003 | Jorgensen ................... 709/226 |
| 6,687,224 | B1 | * | 2/2004 | Ater et al. ................... 370/230 |
| 6,732,179 | B1 | * | 5/2004 | Brown et al. ................. 709/229 |
| 6,850,965 | B2 | * | 2/2005 | Allen .......................... 709/203 |
| 6,882,623 | B1 | * | 4/2005 | Goren et al. ................. 370/230 |
| 6,976,090 | B2 | * | 12/2005 | Ben-Shaul et al. .......... 709/246 |
| 6,982,987 | B2 | * | 1/2006 | Cain ........................... 370/442 |
| 7,031,254 | B2 | * | 4/2006 | Abraham et al. ............. 370/229 |

(Continued)

OTHER PUBLICATIONS

Almajano, Luis and Perez-Romero, Jordi. "Packet Scheduling Algorithms for Interactive and Streaming Services under QoS Guarantee in a CDMA System," Proceedings 56th IEEE Vehicular Technology Conference, vol. 3, 2002, pp. 1657-1661.*

(Continued)

*Primary Examiner*—Jason D Cardone
*Assistant Examiner*—Melvin H Pollack
(74) *Attorney, Agent, or Firm*—Fulbright & Jaworski L.L.P.

(57) ABSTRACT

A method of enforcing network bandwidth limitation includes receiving a request from a client for transmission of a server's feed data and receiving a client timestamp from the client. The method further includes determining if feed data in a previous transmission from the server to the client has been lost, and if so, reimbursing the client for the lost data. The method further includes determining if the client is eligible to receive the requested feed data transmission from the server, and if the client is eligible, then immediately transmitting of the most recent available requested feed data from the server to the client, but if the client is not eligible, then preventing the transmission and withholding the feed data from the client without prolonging the duration of any network connection from the server to the client.

24 Claims, 4 Drawing Sheets

U.S. PATENT DOCUMENTS

| | | | |
|---|---|---|---|
| 7,031,306 B2* | 4/2006 | Amaral et al. | 370/389 |
| 7,047,301 B2* | 5/2006 | Skene et al. | 709/226 |
| 7,058,721 B1* | 6/2006 | Ellison et al. | 709/231 |
| 7,068,660 B2* | 6/2006 | Suni | 370/395.2 |
| 7,085,290 B2* | 8/2006 | Cain et al. | 370/469 |
| 7,092,358 B2* | 8/2006 | Ruutu et al. | 370/230 |
| 7,092,696 B1* | 8/2006 | Hosain et al. | 455/405 |
| 7,093,001 B2* | 8/2006 | Yang et al. | 709/219 |
| 7,103,669 B2* | 9/2006 | Apostolopoulos | 709/231 |
| 7,177,945 B2* | 2/2007 | Hong et al. | 709/238 |
| 7,190,670 B2* | 3/2007 | Varsa et al. | 370/229 |
| 7,191,244 B2* | 3/2007 | Jennings et al. | 709/231 |
| 7,197,557 B1* | 3/2007 | Asar et al. | 709/224 |
| 7,222,147 B1* | 5/2007 | Black et al. | 709/200 |
| 7,225,267 B2* | 5/2007 | Key et al. | 709/235 |
| 7,254,605 B1* | 8/2007 | Strum | 709/203 |
| 7,254,607 B2* | 8/2007 | Hubbard et al. | 709/203 |
| 7,260,635 B2* | 8/2007 | Pandya et al. | 709/226 |
| 7,324,540 B2* | 1/2008 | Vangal et al. | 370/419 |
| 7,330,717 B2* | 2/2008 | Gidron et al. | 455/418 |
| 2002/0073232 A1* | 6/2002 | Hong et al. | 709/238 |
| 2003/0084184 A1* | 5/2003 | Eggleston et al. | 709/234 |
| 2003/0093515 A1* | 5/2003 | Kauffman | 709/224 |
| 2003/0093530 A1* | 5/2003 | Syed | 709/226 |
| 2004/0008688 A1* | 1/2004 | Matsubara et al. | 370/395.21 |
| 2004/0030797 A1* | 2/2004 | Akinlar et al. | 709/232 |
| 2004/0071145 A1* | 4/2004 | Ha et al. | 370/395.43 |
| 2004/0090943 A1* | 5/2004 | da Costa et al. | 370/338 |
| 2005/0177633 A1* | 8/2005 | Plunkett | 709/225 |

OTHER PUBLICATIONS

Sevanto, Jarkko, et al. "Introducing Quality-of-Service and Traffic Classes into Wireless Mobile Networks," Proceedings 1st ACM International Workshop on Wireless Mobile Multimedia, 1998, pp. 21-29.*

Chao, His-Lu and Liao, Wanijun. "Credit-Based Slot Allocation for Multimedia Mobile Ad Hoc Networks," IEEE Journal on Selected Areas in Communications, vol. 21, Issue 10, Dec. 2003, pp. 1642-1651.*

Hamer, L. N. et al. "Framework for Session Set-up with Media Authorization," RFC 3521, Apr. 2003, pp. 1-25.*

Zseby, T. et al. "Policy-Based Accounting," RFC 3334, Oct. 2002, pp. 1-44.*

Camarillo, G. et al. "Integration of Resource Management and Session Initiation Protocol (SIP)," RFC 3312, Oct. 2002, pp. 1-30.*

Snir, Y. et al. "Policy Quality of Service (QoS) Information Model," RFC 3644, Nov. 2003, pp. 1-73.*

Moore, B. et al. "Information Model for Describing Network Device QoS Datapath Mechanisms," RFC 3670, Jan. 2004, pp. 1-97.*

Chaskar, H. "Requirements of a Quality of Service (QoS) Solution for Mobile IP," RFC 3583, Sep. 2003, pp. 1-10.*

* cited by examiner

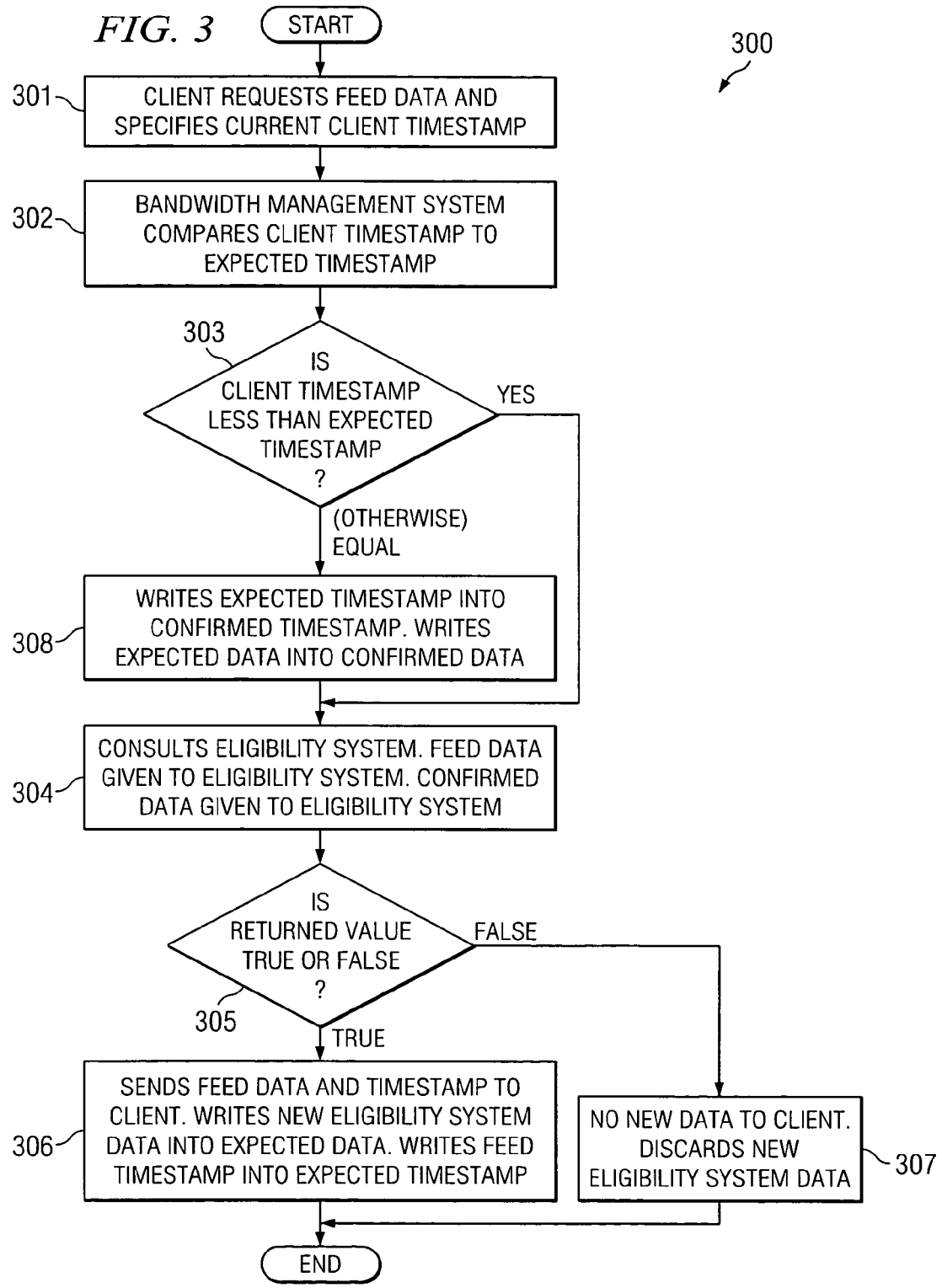

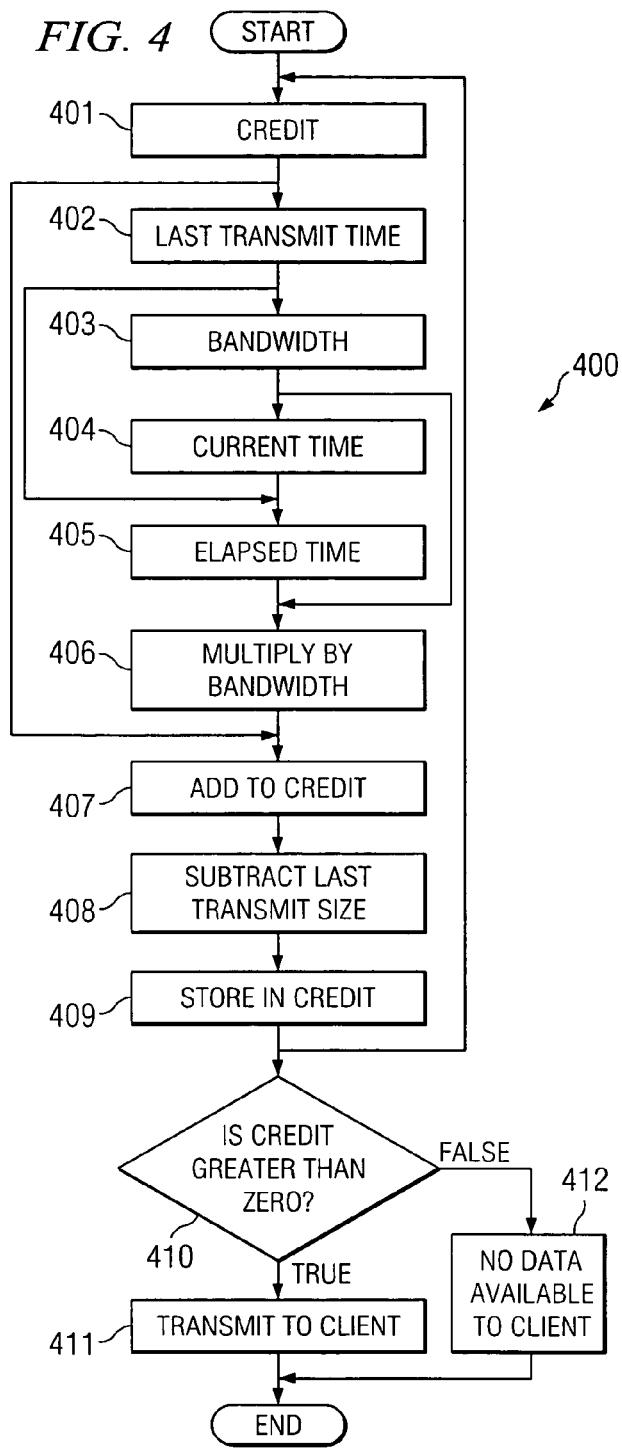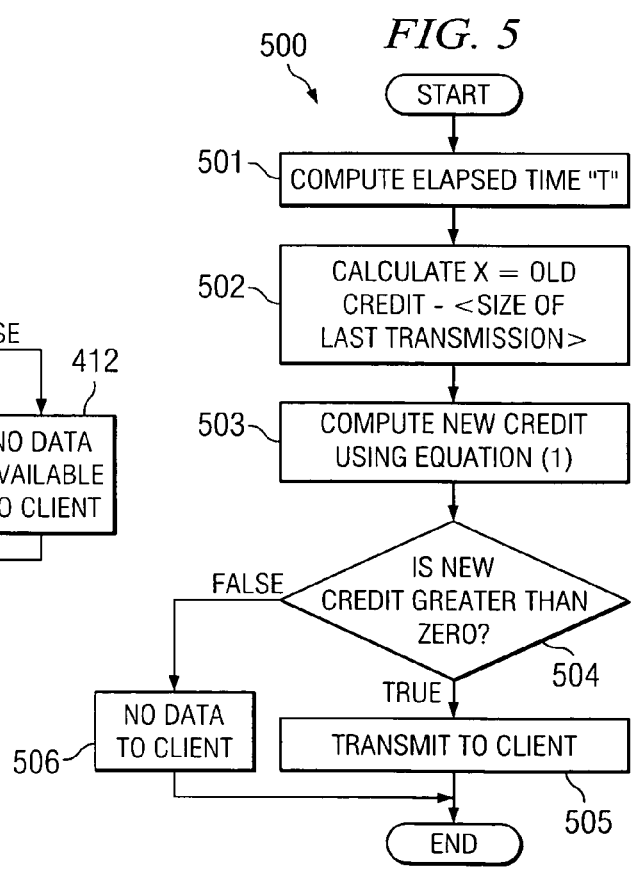

BANDWIDTH MANAGEMENT SYSTEM

CROSS REFERENCE TO RELATED APPLICATIONS

The present application is related to concurrently filed, co-pending, and commonly assigned U.S. patent application Ser. No. 10/791,298, entitled "MOBILE RICH MEDIA INFORMATION SYSTEM", and U.S. patent application Ser. No. 10/792,298 entitled "SYSTEM AND METHOD FOR DEVELOPING INFORMATION FOR A WIRELESS INFORMATION SYSTEM"; and the disclosures of which are hereby incorporated by reference.

TECHNICAL FIELD

The invention relates to networks downloading live-data transmission from multiple feeds to multiple clients and particularly to bandwidth management for such networks.

BACKGROUND OF THE INVENTION

When bandwidth limits are exceeded, traditional byte-by-byte bandwidth management systems prolong connections, physically delaying each information packet on a packet-by-packet basis. In these systems, if a server tries to send through 100 packets, and that causes it to be over the bandwidth limit, but the intended client never receives the packets, they are nevertheless delayed on the basis that they are using too much data. Most traditional bandwidth management systems are ignorant to the nature of the server or the client. They are placed between the server and the client, but cannot determine what the client received or did not receive. In a traditional byte-by-byte system that limits bandwidth for example to $\frac{1}{10}$th the rate that the network supports, a 20K byte transmission requires the server to hold the connection open 10 times longer than if no bandwidth limiting were in place.

BRIEF SUMMARY OF THE INVENTION

In accordance with embodiments of the invention, a system for enforcing network bandwidth limitation is provided. The system is able to determine if a client or multiple clients on the network is eligible to receive requested feed data transmission from a server or multiple servers on the network. If the client is not eligible, then the system is able to prevent the transmission and to withhold the feed data from the client without prolonging the duration of any network connection from the server to the client. Otherwise, if the client is eligible, then the system is able to permit immediate transmission of the most recent available requested feed data from the server to the client. The system is further able to determine if requested feed data in previous transmissions from the server to the client has been lost. If the previously requested feed data has been lost, then the system is able to reimburse the client for the lost requested feed data. Otherwise the system is not able to reimburse the client.

In accordance with other embodiments of the invention, a method of enforcing network bandwidth limitation is provided. The method includes receiving a request from a client for transmission of a server's feed data and receiving a client timestamp from the client. The method further includes determining if feed data in a previous transmission from the server to the client has been lost, and if so, reimbursing the client for the lost data. The method further includes determining if the client is eligible to receive the requested feed data transmission from the server, and if the client is eligible, then immediately transmitting the most recent available requested feed data from the server to the client, but if the client is not eligible, then preventing the transmission and withholding the feed data from the client without prolonging the duration of any network connection from the server to the client.

In accordance with yet other embodiments of the invention, a method of enforcing network bandwidth limitation is provided. The method includes determining the amount of feed data eligible to be received by a client from a server at a current time as a function of credit existing at the time of a previous data transmission, time elapsed between the time of the previous data transmission and the current time, the size of the previous data transmission, and bandwidth limitation configuration settings.

In accordance with yet other embodiments of the invention, a system for enforcing network bandwidth limitation is provided. The system includes means for receiving a request from a client for transmission of a server's feed data, means for receiving a client timestamp from the client, means for determining if feed data in a previous transmission from the server to the client has been lost, and if so, reimbursing the client for the lost data; and means for determining if the client is eligible to receive the requested feed data transmission from the server.

BRIEF DESCRIPTION OF THE DRAWINGS

For a more complete understanding of the present invention, reference is now made to the following descriptions taken in conjunction with the accompanying drawing, in which:

FIG. 3 is a flow diagram depicting an operational sequence of the subsystem of FIG. 2 with bandwidth management, in accordance with embodiments of the invention;

FIG. 4 is a block diagram illustrating the functioning of a simplified-time-slice-eligibility-system, in accordance with embodiments of the invention; and FIG. 5 depicts an operational sequence of an elaborate time-slice-eligibility system, in accordance with embodiments of the invention.

DETAILED DESCRIPTION

Figure 1:
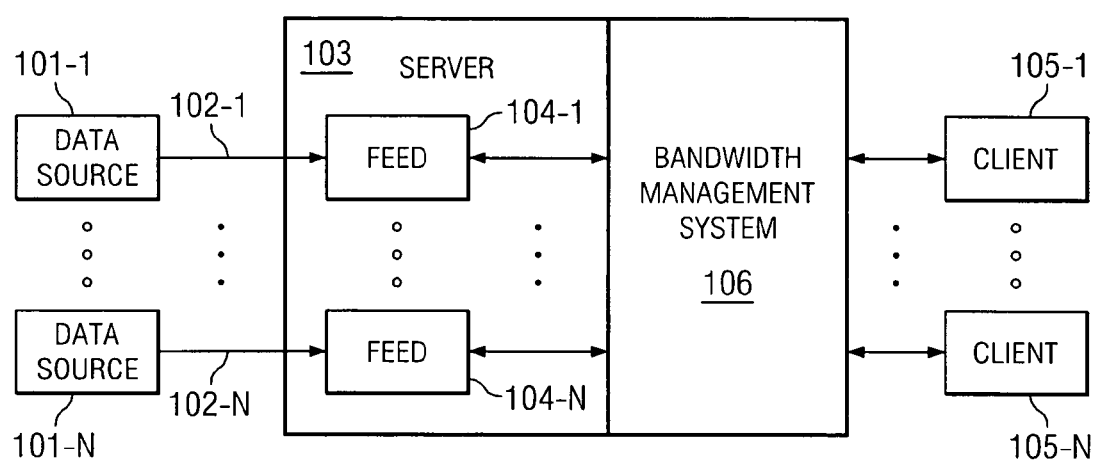
FIG. 1 depicts a system including interacting software components, whose purpose is to deploy small, live-data applications.

FIG. 1 depicts system 100, for example the Macromedia FlashCast™ system, including interacting software components whose purpose is to deploy small, live-data applications. Data sources 101-1, . . . , 101-N provide new data applications 102-1, . . . , 102-N and data updates as soon as available to server 103. Server 103 stores these applications or channels in data caches or feeds 104-1, . . . , 104-N, and deploys these channels individually on a channel-by-channel basis to a plurality of clients 105-1, . . . , 105-N in accordance with a subscription arrangement. Each feed contains data, e.g., stock quotes, weather forecasts, news, etc. The clients may, for example, be subscribers in a wireless phone system. Alternatively, the clients may be computers, e.g., personal computers (PCs) on a network, for example the Internet or local area network. A client may subscribe to multiple feeds and each feed may be subscribed to by multiple clients.

In the software environment of system 100, bandwidth management system 106 mediates the amount of new data sent to each client by each feed. If the data rate for any feed exceeds a predetermined limit for a given client, then bandwidth management system 106 informs that client that no new data is available to that client from that feed. If the client requests retransmission of failed previously transmitted data, bandwidth management system 106 allows retransmission and subtracts the failed data amount from that client's usage. Bandwidth management system 106 enforces network bandwidth limitation, while reimbursing clients for lost data without delaying any given connection.

Figure 2:
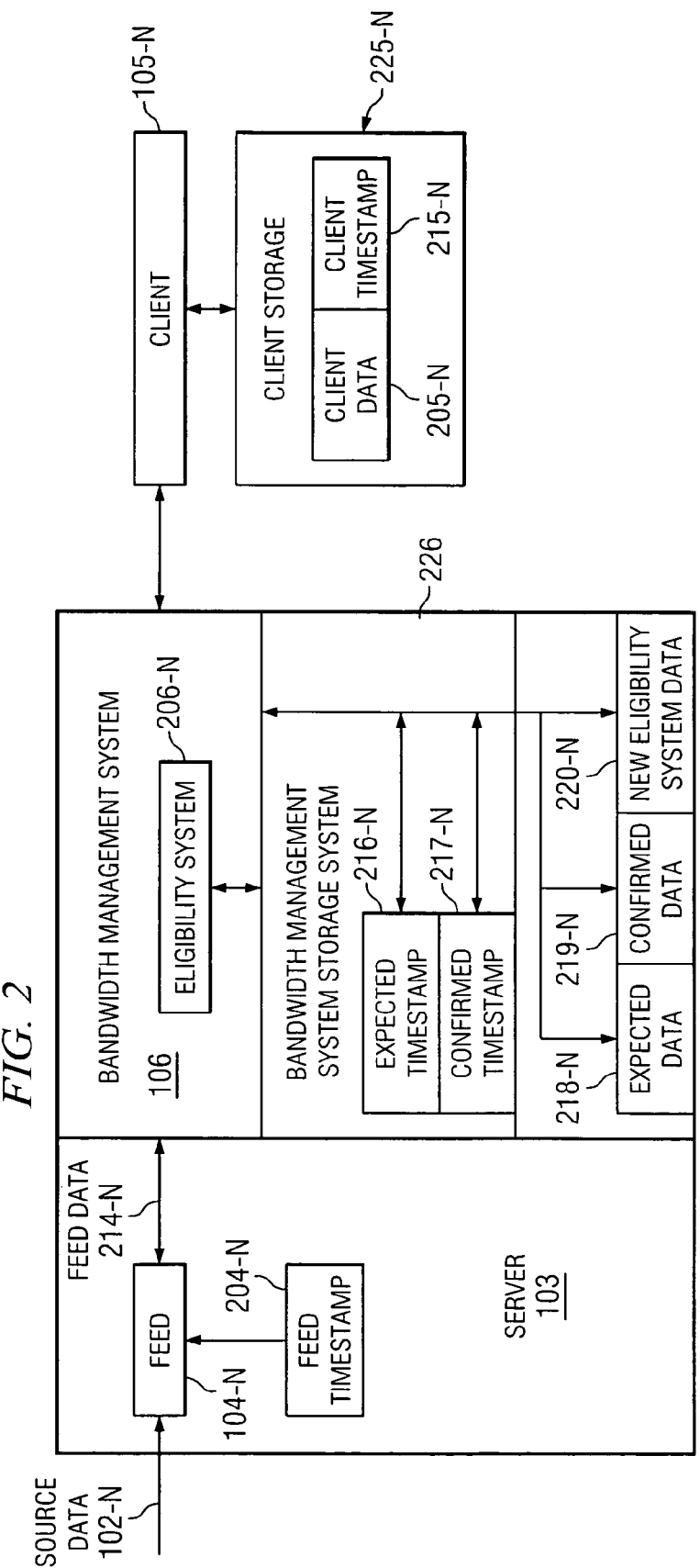
FIG. 2 depicts a subsystem associated with bandwidth management functions, in accordance with embodiments of the invention.

FIG. 2 depicts subsystem 200 of system 100, which is associated with bandwidth management functions, in accordance with embodiments of the invention. Although a typical system contains multiple feeds and multiple clients, for simplicity and without loss of generality, only one feed and one client 105-N are illustrated in FIG. 2. Each feed 104-N contains a timestamp 204-N that changes whenever the data is modified, and monotonically increases. A 'timestamp,' as defined herein, need not have any correlation with physical 'time,' and the term 'timestamp' is chosen only for convenience of describing its monotonically increasing property. By subscribing to a feed, a client indicates that it intends to acquire data from this feed over a subscription period. Each client contains permanent storage 225-N, including client-data 205-N per subscribed feed, and client-timestamp 215-N per subscribed feed.

Bandwidth management system (BMS) 106 includes:
(1) A subsystem for computing eligibility for a client to receive data from a server, referred to as eligibility-system 206-N. A variety of eligibility system configurations can be implemented, each of which defines its own data format.
(2) A BMS permanent storage system 226 storing:
    (a) An expected-timestamp 216-N per feed per client
    (b) A confirmed-timestamp 217-N per feed per client
    (c) Two copies of additional eligibility-system-data as defined by the data format of the specific eligibility system configuration. In some embodiments, these data are referred to as expected-data 218-N and confirmed-data 219-N. Additionally, the BMS storage system stores a transient return value of new eligibility-system-data 220-N from eligibility-system 206-N.

In the simplest operation of the subsystem 200 software environment without bandwidth management system 106:
(a) Clients 105-N request data from feeds, specifying the current value of client-timestamp 215-N;
(b) Feed data 214-N and feed timestamp 204-N are transmitted to client 105-N;
(c) The client stores transmitted data 214-N and timestamp 204-N as new client-data 205-N and client-timestamp 215-N in permanent storage 225-N; and
(d) At subsequent data requests, the client sends the new client-timestamp 215-N along with the request.

Client-timestamp 215-N will increase whenever the client successfully receives and stores new data from the server. It will not increase if the client fails either operation (b) or (c) above. It will not increase if the server had no new data, and it will never decrease.

FIG. 3 is a flow diagram depicting operational sequence 300 of subsystem 200 with bandwidth management, in accordance with embodiments of the invention. In operation 301, client 105-N requests data from feeds 104-N, specifying the current value of client-timestamp 215-N. In operation 302, bandwidth management system 106 compares client-timestamp 215-N to expected-timestamp 216-N for the given client and feed. In operation 303, if client-timestamp 215-N is less than expected-timestamp 216-N, the following operations occur: In operation 304, eligibility-system 206-N is consulted, and the eligibility-system is given the feed-data to be transmitted 214-N and the stored confirmed-data 219-N from eligibility-system-data store 226. In operation 305, eligibility system 206-N returns a TRUE or FALSE value and additionally a value for new eligibility-system-data 220-N.

In operation 306, if the return value in operation 305 is TRUE, feed-data 214-N is sent to client 105-N, new eligibility-system-data 220-N is written into expected-data store 218-N, and feed time-stamp 204-N is written into expected-timestamp 216-N. In operation 307, if the return value in operation 305 is FALSE, client 105-N is informed that no new data is available, and new eligibility-system-data 220-N is discarded.

In operation 308, client-timestamp 215-N in operation 303 must be equal to expected-timestamp 216-N, since it cannot be larger. The value of expected-timestamp 216-N is written into confirmed-timestamp 217-N, and the value of expected-data 218-N is written into confirmed-data 219-N. Then operational sequence 300 continues with operation 304 as above.

In above operational sequence 300, if the client-timestamp is less than the expected-timestamp, the BMS system consults the eligibility subsystem directly. The difference between that case and the case in which the respective timestamps are equal is that in the latter case the confirmed data is replaced with the expected data before consulting the eligibility system, meaning that the eligibility-system will compute eligibility on the basis of the last transmission, whereas in the case in which the client timestamp is less, the data is not written over, and the eligibility-system will therefore compute eligibility based on the last confirmed data (ignoring the effects of any failed data transmissions in the interim).

In a simple example implementation of operational sequence 300, eligibility system may allow one data transmission every 10 minutes. Such an eligibility system would, for example, store the time of the last transmission in its eligibility-system-data. As in other embodiments of the invention, the data transmitted can be the full feed-data, or alternatively an update to the feed-data of an earlier transmission corresponding to the existing client-timestamp. The eligibility-system would then make TRUE/FALSE decisions based on the following rule: Return TRUE if the time elapsed since the time stored in eligibility-system-data is greater than or equal to 10 minutes, and return new eligibility-system-data equal to the current time. Otherwise, return FALSE.

In an example operating scenario of the above system implementation, for simplicity, only one feed and one client are involved. At the beginning of the scenario, the client's most recent request for data occurred at 0:00GMT, the timestamp value was 0, and the data and timestamp were successfully stored by the client. Thus expected-timestamp and client-timestamp are both zero. Expected-data is set to 0:00GMT.

At 0:05 GMT, in accordance with operation 301, the client requests data, sending client-timestamp=0, which is equal to expected-timestamp. Therefore, in accordance with operation 308, confirmed-timestamp is set to 0, and confirmed-data is set to 0:00GMT. In accordance with operation 305, the eligibility system is consulted, and since the time elapsed from 0:00GMT to 0:05 is less than 10 minutes, the return value is FALSE, and in accordance with operation 307, no data is returned to the client. Thus, the bandwidth management system prevents the client from receiving data at a rate faster than the eligibility-system indicates.

Subsequently, at 0:10GMT, the client requests data, again sending client-timestamp=0. If the feed-data has changed, the feed now has a timestamp of 1. Since client-timestamp=expected-timestamp, in accordance with operation 303, confirmed-timestamp and confirmed-data are set to 0 and 0:00GMT, respectively. Since the elapsed time from 0:00GMT to 0:10GMT>=10 minutes, then the return value is TRUE in operation 305, the feed-data and timestamp are transmitted to the client, and the value 0:10GMT is written into the expected-data value. The client receives the freshest feed-data, i.e., the feed-data associated with the feed-timestamp of 1.

If the network fails to deliver the transmission at 0:10GMT, or the client fails before it has written the new value of client-timestamp to its storage, suppose that at 0:15GMT the client requests data. Since client time-stamp=0 is less than the expected-time-stamp of 1, in accordance with operation 303, the confirmed-timestamp and confirmed-data remain at the values of "0" and "0:00GMT" respectively. The eligibility system is consulted in operation 304 using the eligibility-system-data of 0:00GMT. The eligibility system returns TRUE, since the elapsed time from 0:00GMT to 0:15 GMT is greater than 10 minutes. In accordance with operation 306, the data and timestamp are transmitted to the client, and the value of 0:15GMT is written into the expected-data value. The client again receives the freshest feed-data.

Thus, the bandwidth management system does not penalize the client for failure to receive or record data transmissions. Had the client successfully recorded the data transmitted at 0:10GMT, it would have been ineligible to receive a transmission at 0:15GMT. However, since the earlier transmission failed, the new transmission is allowed.

In other embodiments, the eligibility-system can be divided into two components: the eligibility-schedule system and the time-slice-eligibility-system. The former allows the administrator or provisioner to specify bandwidth limitations that vary over the course of a day. The latter computes bandwidth eligibility during a period of constant limitation.

FIG. 4 is a block diagram illustrating the functioning of simplified-time-slice-eligibility-system 400, in accordance with embodiments of the invention. System 400 stores the following eligibility-system data: "credit" at block 401, measured in bytes; and "last-transmit-time" at block 402, the time of the last transmission of data. It is provisioned using the data, "bandwidth" at block 403, specified in bytes per second.

System 400 could work as follows:

When invoked to determine eligibility of a client to receive data from a feed, (1) Compute the number of seconds elapsed 405 between last-transmit-time 402 and current time 404, multiply in operation 406 by bandwidth allocation 403, add this to "credit" 401 in operation 407, subtract the size of the last transmission in operation 408, and store the result in "credit" 401 in operation 409.

(2) If credit is greater than 0 in operation 410, return TRUE, and transmit data to client in operation 411. Otherwise return FALSE, and make no data available to client in operation 412.

This system will, averaged over an infinitely long period of time, cause each client to receive data at a rate of "bandwidth" bytes/second. Additionally, if a client under this system does not request updates for a period of T time, it will receive a positive credit of T * bandwidth bytes, allowing it to receive T * bandwidth bytes in the future without delay.

As discussed in connection with FIG. 2, the system stores two copies of the eligibility system data, and the operation of the system shows how and when those data are overwritten. Since "last-transmit-time" is an element of the eligibility-system, there are in fact two-last-transmit times, and that the eligibility-system will be given either the confirmed or unconfirmed data value, depending on whether the transmissions being sent follow a transmission success or transmission failure. This also applies to the other data fields such as "credit"—there is, effectively a separate "confirmed-credit" and "unconfirmed-credit" due to the two copies of data mention in I.D.2.c. It should be kept in mind that it is the overall system that concerns itself with the difference between "confirmed" and "unconfirmed" data, and that the eligibility-system subcomponent need not be designed with these issues in mind, but can be designed as though all data is confirmed and no transmissions are ever lost.

An eligibility-schedule system, which may be used with either the simplified or a more elaborate time-slice-eligibility system, is provisioned as follows:

(a) The provisioner or administrator provides a sequence of bandwidth-limitation descriptions, each of which consists of a start-time and a bandwidth-limitation data, in a format specified by the time-slice-eligibility system.

(b) The first start-time must be 0.

(c) The bandwidth-limitation descriptions are sorted by start-time.

(d) Each bandwidth-limitation description can be understood as defining a bandwidth limit over a given time-slice. Specifically, the Nth bandwidth-limitation description defines the bandwidth limitation from its start-time to the start-time of the N+1th bandwidth-limitation description. The last bandwidth-limitation description defines the bandwidth limitation from its start-time to 24.

e) The start-times are interpreted as hours since midnight, and repeat after each day.

The method by which the eligibility-schedule decides eligibility of a client to receive data from a feed is as follows:

(a) The set of bandwidth-limitations whose time-slices overlap with the period of time between the last confirmed-delivery time and the current time is found.

(b) For the first of these time-slices the time-slice-eligibility-system is asked to compute the new credit, based on the size of the last transmission, the previous stored value of credit, the last transmit time, and the earlier of current-time 404 or end of the time-slice, using essentially the procedure described in connection with operations 402-409 of FIG. 4.

(c) For each remaining time-slice, in order, the time-slice-eligibility-system is asked to compute the new credit, based on a zero transmission size, the credit returned from the previous time-slice, the beginning of the time slice in lieu of last transmit time 402, and the earlier of current-time 404 or end of the time-slice, essentially by iterating operations 402-409 of FIG. 4.

(d) Finally, the computed credit is stored in the eligibility-system data, and the system returns TRUE if the credit is positive, and FALSE otherwise, as depicted in operations 410-412 of FIG. 4.

Under this system, if a provisioner or administrator specifies that bandwidth for a stock quotation client is accumulated at, e.g. 10 KB/second during market hours, and 0 KB/second after market close, then for example, a stock quotation client that receives no transmissions during market hours will have accumulated "credit" during the market hours, and may be eligible to receive transmissions after market close. Whereas, a stock quotation client that received its full allotment of data transmissions during market hours will have zero credit remaining at market close, and will accumulate no further credit until market open and thus be ineligible to receive new data until that time.

An alternative embodiment of an eligibility-schedule system can operate as follows:

(a) The single bandwidth-limitation whose time-slice encompasses the current time is found;
(b) If the last transmit time is encompassed by this same time-slice, then the time-slice-eligibility-system is asked to compute the new credit as previously described;
(c) If the last transmit time is not encompassed by this same time-slice, then the time-slice-eligibility-system is asked to compute the new credit based on the size of the last transmission, zero previous credit, and the interval from the beginning of the time-slice to the current time.

This, in effect, causes user's credit to reset to zero at the end of the time slice. Thus any credit not "used" in the allotted time is "lost."

A more elaborate time-slice-eligibility system implementation, in accordance with embodiments of the invention, uses exponential decay to "make old credit worth less than new credit." Under the simple time-slice system, a client that makes no requests during a day will receive one day worth of credit (24 hrs*60 min/hrs*60 sec/min*allotted bandwidth), regardless of whether the unused day occurred yesterday or a year ago. The system described below causes the credit of an unused hour to become less as time passes.

The elaborate time-slice-eligibility-system is provisioned with two parameters describing a time-slice, rather than a single value "bandwidth". Those two parameters are referred to as K and C.

Operation (1) of the simple-time-slice-eligibility system read as follows:

(1) compute the number of seconds elapsed between the last-transmit-time and the current time, multiply by bandwidth allocation during the elapsed time, add the result to "credit," subtract the size of the last transmission, and store the result in "credit".

FIG. 5 depicts operational sequence 500 of an elaborate time-slice-eligibility system, in accordance with embodiments of the invention, in which the above operation is replaced with the following: In operation 501, compute the number of seconds elapsed between the last-transmit-time and the current time, and call this elapsed time "T." In operation 502, subtract the size of the last transmission from the previous value of credit and call this value "X." In operation 503, compute the new value of credit according to the following equation:

$$\text{new-credit} = X^* \text{Exp}(-C^*T) - (K/C)^*(\text{Exp}(-C^*T) - 1), \quad (1)$$

where "Exp" denotes the well-known exponential function. The administrator or provisioner does not provide C and K directly, but rather parameters M and R, from which C and K are computed as follows:

$$C = -\ln(1 - R/M) \quad (2)$$

$$K = R^*C/(1 - \text{Exp}(C)), \quad (3)$$

assuming that C, K, M, and R are in compatible units, where "ln" denotes the well-know natural logarithm function.

K and C are intermediate computational values, representing a "change of base" transformation from the user-specified M and R. M and R correspond, respectively, to the maximum bytes of credit one can accumulate and the number of bytes that one should accumulate in a unit time interval. The above equations transform these into K and C. The computation of C uses only R and M, and the computation of K uses R, C, and M (implicitly through C). Therefore K and C are uniquely specified by R and M. The intuitive meanings of C and K are:

C is the decay constant that determines how quickly old credit becomes less valuable, and K is essentially the "natural" bandwidth one would obtain, if there were no exponential decay (it is always higher than R). It is easiest to think in terms of how to calculate R from K and C. Applying decay constant C to natural bandwidth K results in a reduced effective bandwidth R. A system administrator may feel comfortable thinking in terms of M and R.

Mathematical analysis shows that M corresponds to the amount of data credit that will be accumulated if an infinite amount of time elapses with no requests. R corresponds to the amount of data that will be transmitted during a time interval of unity length.

Operations 504-506 of FIG. 5 depict the same functions as operations 410-412, respectively, of FIG. 4.

Additionally, unlike traditional bandwidth management systems, embodiments of the invention do not "delay" data transmissions, but rather prevent them entirely, and require clients to re-request them in the future. Furthermore, transmissions are accepted or rejected on transmission by transmission basis, not a byte-by-byte basis. In a traditional byte-by-byte system that limits bandwidth for example to 1/10th the rate that the network supports, a 20K byte transmission requires the server to hold the connection open 10 times longer than if no bandwidth limiting were in place. In accordance with embodiments of the invention, the server closes its connection immediately, if no data is allowed to be transmitted, or sends the data at full speed if it is permitted. Connections are not needlessly prolonged, and server resources are therefore conserved.

For example, in a bandwidth-unlimited system, a transmission may start at time S and end at time S+T. In a traditional byte-by-byte bandwidth-limited system, the transmission starts at the same time S, but ends at time S+T*LIMITFACTOR, in which transmission is prolonged by bandwidth-limiting factor LIMITFACTOR. This implies that the server must allocate resources to maintain the connection for a greater period of time. In embodiments of the present invention, the transmission starts at time S+E and ends at time S+E+T. The server therefore needs to maintain the connection open only for time T following an elapsed time denoted as time E, during which the eligibility of the client to receive data is established in accordance with the bandwidth management algorithms. If the client attempts to initiate transmission prior to S+E, the connection is "refused."

In some embodiments, transmissions deemed "high priority" by the bandwidth management system may be sent at all times, regardless of the response of the eligibility system. By allowing the eligibility system to compute eligibility (and modify its eligibility data), and by further ignoring the true/false return result of the eligibility system, high priority transmissions are never prevented, but the increased bandwidth usage by high-priority transmissions reduces bandwidth available for future standard transmissions.

Some variations of bandwidth management system 106 provide the capability of computing for a given client and a given feed the earliest elapsed time E at which the client will be eligible to receive data from the feed. Some of such variations are further capable of directly notifying the client at that time. If credit for a given client under a given eligibility system is currently positive, eligibility time E is just the current time. Otherwise, credit is negative, and eligibility time E is a future time calculated by modeling the eligibility system as algebraic equation (s), for example Equations (1-3), setting credit equal to zero and solving for time T=E. Eligibility time E may be transmitted to the client or otherwise incorporated into the network protocol to cause the client to defer making requests prior to time E, thus preventing bandwidth-consuming premature request/reject cycles. In some embodiments, time E is not transmitted directly to the client, but is transmitted to another server subcomponent, which at time E sends a notification to the client that new data is available, if and only if data has been updated in one of the subscribed feeds for that client.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system for enforcing network bandwidth limitation, comprising:
   an eligibility system that determines if a client or multiple clients on said network is eligible to receive requested feed data transmission from a server or multiple servers on said network based upon an amount of time since last successful receipt of a feed data transmission;
   if said client is not eligible, then said system is able to prevent said transmission and to withhold said feed data from said client without prolonging the duration of any network connection from said server to said client; otherwise
   if said client is eligible, then said system is able to permit immediate transmission of the most recent available requested feed data from said server to said client; and
   said system is able to determine if requested feed data in previous transmissions from said server to said client has been lost;
   if said previously requested feed data has been lost, then said system is able to reimburse said client for said lost requested feed data, otherwise not to reimburse said client.

2. The system of claim 1 wherein said network is a wireless network.

3. The system of claim 1 wherein said network is selected from a local area network and the Internet.

4. The system of claim 1 wherein said multiple clients are personal computers.

5. The system of claim 1 wherein said multiple clients are wireless telephones.

6. The system of claim 1 wherein said server comprises a feed timestamp that monotonically increases whenever said feed data at said server is updated.

7. The system of claim 1 wherein said client comprises permanent storage for client data and a client timestamp.

8. The system of claim 1 comprising a permanent storage system for expected timestamp, confirmed timestamp, and copies of eligibility system data.

9. The system of claim 1 comprising:
   a sequence of bandwidth-limitation descriptions, each of which consists of a start-time and a bandwidth-limitation data, such that said bandwidth-limitation descriptions are sorted by start-time, such that an Nth bandwidth-limitation description defines the bandwidth limitation from its start-time to the start-time of an N+1 th bandwidth-limitation description, such that the last bandwidth-limitation description of said sequence of bandwidth-limitation descriptions defines said bandwidth limitation from its start-time to 24, and such that said start-times are interpreted as hours since midnight, and repeat after each day.

10. The system of claim 1 further able to compute for said client and said feed data the earliest elapsed time E at which said client will be eligible to receive said feed data.

11. The system of claim 1 wherein the amount of said feed data eligible to be received by said client from said server at a current time is determined as a function of credit existing at the time of a previous data transmission, time elapsed between said time of previous data transmission and said current time, the size of said previous data transmission, and bandwidth limitation configuration settings.

12. The system of claim 11, wherein the amount of said feed data eligible to be received by said client from said server is computed by the equations:

$$\text{new-credit} = X^*\text{Exp}(-C^*T) - (K/C)^*(\text{Exp}(-C^*T)-1),$$
where
$$C = -\ln(1-R/M); K = R^*C/(1-\text{Exp}(C)), \text{ and}$$

where X is the previous value of credit reduced by the size of the last transmission, T is the number of seconds elapsed between the last-transmission-time and the current time, Exp denotes the exponential function, ln denotes the natural logarithm function, K and C are intermediate computational values, M corresponds to the amount of data credit that will be accumulated if an infinite amount of time elapses with no requests, and R corresponds to the amount of data that will be transmitted during a time interval of unity length.

13. A method of enforcing network bandwidth limitation, said method comprising:
   receiving a request for transmission of data;
   computing transmission eligibility; and
   modifying eligibility data based upon an amount of time since last successful receipt of a feed data transmission.

14. The method of claim 13 wherein said request is for transmission of high priority data and wherein said high priority data may be sent at all times, regardless of the computed transmission eligibility.

15. The method of claim 14 further comprising ignoring said computed transmission eligibility, such that the increased bandwidth usage by said high-priority data reduces bandwidth available for future standard transmissions.

16. A method of enforcing network bandwidth limitation, said method comprising:
   receiving a request from a client for transmission of a server's feed data;
   receiving a client timestamp from said client;
   determining if feed data in a previous transmission from said server to said client has been lost, and if so, reimbursing said client for said lost data;
   determining if said client is eligible to receive said requested feed data transmission from said server by computing the elapsed time between a last feed data transmission and a current feed data request; multiplying said elapsed time by a predetermined bandwidth allocation, adding the product to a stored credit value reduced by the size of said last feed data transmission, and storing the result as a new credit value; and if said new credit value is greater than zero, said client is eligible; otherwise said client is not eligible;

if said client is eligible, then immediately transmitting the most recent available requested feed data from said server to said client; and if said client is not eligible, then preventing said transmission and withholding said feed data from said client without prolonging the duration of any network connection from said server to said client.

17. The method of claim 16 wherein said determining if feed data has been lost comprises comparing said client timestamp to an expected timestamp, and if equal, then writing said expected timestamp into a confirmed timestamp and writing an expected data into a confirmed data, and if smaller, then making no change to said confirmed timestamp and said confirmed data.

18. The method of claim 16 wherein said determining if said client is eligible comprises:

providing a sequence of bandwidth-limitation descriptions, each of which consists of a start-time and a bandwidth-limitation data;

sorting said bandwidth-limitation descriptions by start-time, such that an Nth bandwidth-limitation description defines the bandwidth limitation from its start-time to the start-time of an N+1th bandwidth-limitation description, such that the last bandwidth-limitation description defines the bandwidth limitation from its start-time to 24, and such that said start-times are interpreted as hours since midnight, and repeat after each day.

19. The method of claim 18 further comprising:

selecting the set of said bandwidth-limitation descriptions which overlaps with the elapsed time between the most recent previous transmission and the current time;

computing new credit, based on the size of said most recent previous transmission, the previous stored value of credit, and the elapsed time from said last transmission time to the earlier of the current-time or the end of said bandwidth limitation description;

for each remaining bandwidth-limitation description, in sequence, computing new credit, based on zero transmission size, the credit returned from the previous bandwidth limitation description, and the elapsed time from the start of said bandwidth limitation description and the earlier of said current-time or end of said bandwidth limitation description;

storing the result as a new credit value; and if said new credit value is greater than zero, said client is eligible; otherwise said client is not eligible and no feed data transmission is available to said client.

20. The method of claim 18 further comprising:

determining a single bandwidth-limitation-description whose time-slice encompasses the current time;

if said time-slice encompasses the last transmit time, then computing new credit, based on the size of said most recent previous transmission, the previous stored value of credit, and the elapsed time from said last transmission time to the earlier of the current-time or the end of said bandwidth limitation description; otherwise, if said time-slice does not encompass said last transmit time, then computing said new credit, based on the size of said last transmission, zero previous credit, and the interval from the beginning of said time-slice to said current time.

21. A method of enforcing network bandwidth limitation, wherein the amount of feed data eligible to be received by a client from a server at a current time is determined as a function of credit existing at the time of a previous data transmission, time elapsed between said time of previous successful data transmission and said current time, the size of said previous data transmission, and bandwidth limitation configuration settings.

22. The method of claim 21 wherein said amount of said feed data eligible to be received by said client from said server is computed by the equations:

$$\text{new-credit} = X*\text{Exp}(-C*T) - (K/C)*(\text{Exp}(-C*T) - 1);$$
where $$C = -\ln(1 - R/M); K = R*C/(1 - \text{Exp}(C)); \text{ and}$$

where X is the previous value of credit reduced by the size of the last transmission, T is the number of seconds elapsed between a last-transmission-time and a current time, Exp denotes the exponential function, ln denotes the natural logarithm function, K and C are intermediate computational values, M corresponds to the amount of data credit that will be accumulated if an infinite amount of time elapses with no requests, and R corresponds to the amount of data that will be transmitted during a time interval of unity length.

23. The method of claim 21 further comprising computing for said client and said feed data the earliest elapsed time E at which said client will be eligible to receive said feed data.

24. A system for enforcing network bandwidth limitation, said system comprising:

means for receiving a request from a client for transmission of a server's feed data;

means for receiving a client timestamp from said client;

means for determining if feed data in a previous transmission from said server to said client has been lost, and if so, reimbursing said client for said lost data; and means for determining if said client is eligible to receive said requested feed data transmission from said server based upon an amount of time since last successful receipt of a feed data transmission.

* * * * *

UNITED STATES PATENT AND TRADEMARK OFFICE
CERTIFICATE OF CORRECTION

PATENT NO. : 7,478,158 B1 Page 1 of 1
APPLICATION NO. : 10/791311
DATED : January 13, 2009
INVENTOR(S) : Dwight O. Rodgers et al.

It is certified that error appears in the above-identified patent and that said Letters Patent is hereby corrected as shown below:

In the specification:

Column 1, Line 10, delete the portion of text reading "Ser. No. 10/792,298" and replace with --Ser. No. 10/791,299--.

In the claims:

Column 10, Claim 12, Line 31, delete the portion of text reading "in" and replace with --ln--.

Signed and Sealed this

Third Day of March, 2009

JOHN DOLL
*Acting Director of the United States Patent and Trademark Office*